US006728585B2

(12) United States Patent
Neoh

(10) Patent No.: US 6,728,585 B2
(45) Date of Patent: Apr. 27, 2004

(54) PERSONAL ON-DEMAND AUDIO ENTERTAINMENT DEVICE THAT IS UNTETHERED AND ALLOWS WIRELESS DOWNLOAD OF CONTENT

(75) Inventor: Chong Lim Neoh, Singapore (SG)

(73) Assignee: FreeSystems Pte, Ltd., Singapore (SG)

( * ) Notice: Subject to any disclaimer, the term of this patent is extended or adjusted under 35 U.S.C. 154(b) by 0 days.

(21) Appl. No.: 09/969,692

(22) Filed: Oct. 3, 2001

(65) Prior Publication Data

US 2002/0040255 A1 Apr. 4, 2002

Related U.S. Application Data

(60) Provisional application No. 60/237,640, filed on Oct. 3, 2000.

(51) Int. Cl.[7] .......................... G06F 17/00; H04H 5/00; H04R 5/02; H04R 1/02

(52) U.S. Cl. ............................ 700/94; 381/2; 381/311; 381/334

(58) Field of Search ............................... 381/77, 74, 2, 381/311, 334, 312; 700/94; 455/41, 568, 569; 301/334, 2

(56) References Cited

U.S. PATENT DOCUMENTS 5,247,293 A 9/1993 Nakagawa ............. 340/825.25
5,579,430 A 11/1996 Grill et al. ................ 395/2.12
5,983,100 A * 11/1999 Johansson et al. .......... 455/426
6,192,340 B1 * 2/2001 Abecassis ................... 704/270
6,240,194 B1 * 5/2001 De Koning ................. 381/315
6,466,677 B1 * 10/2002 Bush .......................... 381/300
6,549,942 B1 * 4/2003 Janky et al. ................ 709/219
2001/0003542 A1 * 6/2001 Kazunori .................... 381/334
2001/0049262 A1 * 12/2001 Lehtonen ..................... 455/41

FOREIGN PATENT DOCUMENTS

KR 99-24278 1/2001

OTHER PUBLICATIONS

Infrared Data Association (IrDA) provides industry standard specifications for the transfer of digital data between personal computers, personal digital assistants, laptops, etc.
www.remotesolution.com/mp3/overview.htm, Aug. 30, 2000.
Inventors application under attorney's docket # FS–99–001.

* cited by examiner

*Primary Examiner*—F. W. Isen
*Assistant Examiner*—Elizabeth McChesney
(74) *Attorney, Agent, or Firm*—George O. Saile; Stephen B. Ackerman; Rosemary L. S. Pike

(57) ABSTRACT

Described is a personal on-demand audio entertainment system with a base unit attached to a personal computer or other source, a headphone unit and a remote control unit. The base unit transmits digital audio content to the headphone unit using infrared, radio frequency, magnetic or electromagnetic coupling. These data are stored in solid-state memory within the headphone unit. In the headphone unit, the stored digital audio content is converted to analog audio signals, amplified and sent to transducers for conversion to audio signal for the listener during playback. The system is designed such that playback may occur during the downloading process. The remote control unit also uses infrared, radio frequency, magnetic or electromagnetic coupling for communication to the headphone unit. This communication is made using a different channel and does not interfere with the audio data downloading. The remote control unit has a display and allows for control of player functions and modification of audio characteristics such as volume, bass, treble, balance, etc.

33 Claims, 1 Drawing Sheet

PERSONAL ON-DEMAND AUDIO ENTERTAINMENT DEVICE THAT IS UNTETHERED AND ALLOWS WIRELESS DOWNLOAD OF CONTENT

The instant application claims priority to U.S. Provisional Application, Ser. No. 60/237,640, filed Oct. 3, 2000, which is herein incorporated by reference.

BACKGROUND OF THE INVENTION (1) Field of the Invention

The invention generally relates to a wireless type of personal on-demand audio entertainment device and, more particularly, to a wireless device that allows download of music from a computer or other device without using wires for the connection.

A signal reproducing device embodying the invention comprises solid state storage for the signal source and allows download of content to the signal source by non-contact means such as infrared or radio frequency or magnetic coupling or other electromagnetic coupling. Downloading may be performed while listening to the audio signal. Control of the signal reproducing device may be provided by a lightweight wireless control unit.

(2) Description of Prior Art

The most popular current means of personal on-demand audio entertainment is delivered by means of headphones connected to a source device by wires. Refer now to FIG. 1, illustrating a typical Walkman (registered trade name) stereo headphone cassette or CD player device. The audio content is stored in magnetic, optical or solid state media (not shown) housed within the player 10. The signals from these media are converted to audio signals that are amplified prior to delivery by wires 12 to transducers within headphones or earphones 14. The wires 12 can impede motion of the user and are prone to failure due to handling. One example of this type of system (wired headphones and base unit) using solid-state storage is marketed by HanGo Electronics Company. Their MPRIDE system is an MP3 player allowing downloads of 32 or 64 Mbytes of MP3 audio content via connection to a computer parallel port.

Referring to FIG. 2, U.S. Pat. No. 5,247,293 to Nakagawa takes this a step further by separating the player 10 and headphones 14. The two units are coupled by radio frequency signals allowing transmission of the audio signal to a smaller, less cumbersome, remote unit 18. The headphones 14 still use wires 12. The remote unit 18 allows control of the player 10 functions such as volume, fast forward, etc.

Vertical Horizon markets a headphone unit (Korea patent pending number 99-24278) that allows downloading of 32 Mbytes of MP3 audio content from a computer parallel port. In this case, the storage and controls are all contained within the headphone unit. Downloading is accomplished through a wired connection. Sennheiser markets a wireless listening system where a transmitter unit is connected to an audio source. This is coupled via a 900 MHz radio frequency signal to a pair of headphones.

Advances in the size and speed of storage device have allowed this technology to flourish. In addition, digital encoding and compression techniques have allowed more content to be placed within a fixed size memory. U.S. Pat. No. 5,579,430 to Grill et al. teaches one such method for encoding and compression. The method uses statistical methods in the encoding process to compress the data.

SUMMARY OF THE INVENTION

A principal object of the present invention is to provide an audio entertainment device that allows wireless operation.

A second object of the present invention is to provide an audio entertainment device that allows wireless downloading of audio content from a personal computer or other digital audio data source.

Another object of the present invention is to provide an audio entertainment device that allows wireless downloading of audio content using infrared, radio frequency, magnetic coupling or other electromagnetic means.

Another object of the present invention is to provide an audio entertainment device that allows wireless downloading of audio content simultaneously during playback of the audio content.

Another object of the present invention is to provide an audio entertainment device where conversion from digital to audio format is done within the headphone unit thereby reducing impedance losses typically experienced in wired headphone units.

Another object of the present invention is to provide an audio entertainment device with a separate handheld remote unit to allow control of the downloading and audio characteristics.

A still further object of the present invention is to provide an audio entertainment device that may be operated with a standard audio source as a wireless headphone unit.

These objects are achieved using a system with a headphone unit, a remote control unit and base unit attached to a personal computer, a home entertainment unit such as a DVD player or TV or other source. The base unit transmits digital audio content to the headphone unit using infrared, radio frequency, magnetic coupling or other electromagnetic means. These data are stored in solid-state memory within the headphone unit. In the headphone unit, the stored digital audio content is converted to analog audio signals, amplified and sent to transducers for conversion to audio signal for the listener during playback. The system is designed such that playback may occur during the downloading process. The remote control unit also uses infrared, radio frequency, magnetic coupling or other electromagnetic means for communication to the headphone unit. The remote communication is made using a different channel that does not interfere with the downloading of digital audio data. The remote control unit can have a display and allows for control of playback functions, turns the unit on or off and modifies the playback audio characteristics such as volume, bass, treble, balance, etc.

BRIEF DESCRIPTION OF THE DRAWINGS

In the accompanying drawings forming a material part of this description, there is shown.

DESCRIPTION OF THE PREFERRED EMBODIMENTS

The present invention incorporates several features that improve upon prior art personal audio entertainment designs. In particular, it facilitates wireless connections for both content download and playback control.

Figure 1:
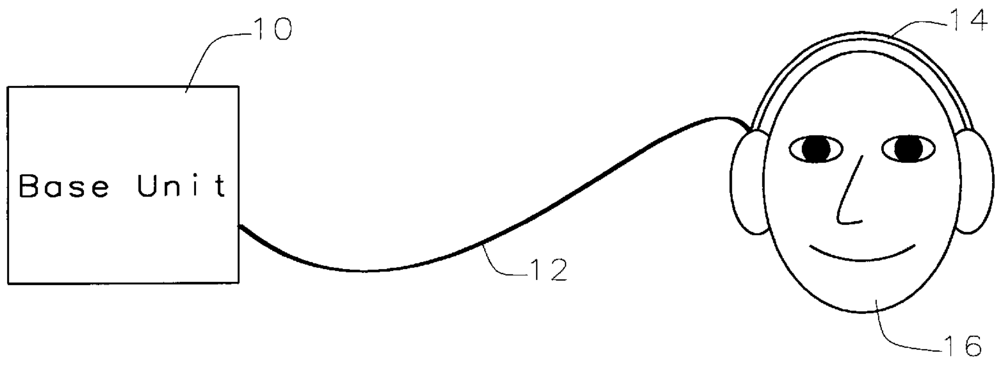
FIG. 1 Prior Art
FIG. 1 illustrating a prior art example of a wired personal audio entertainment device.
Figure 2:
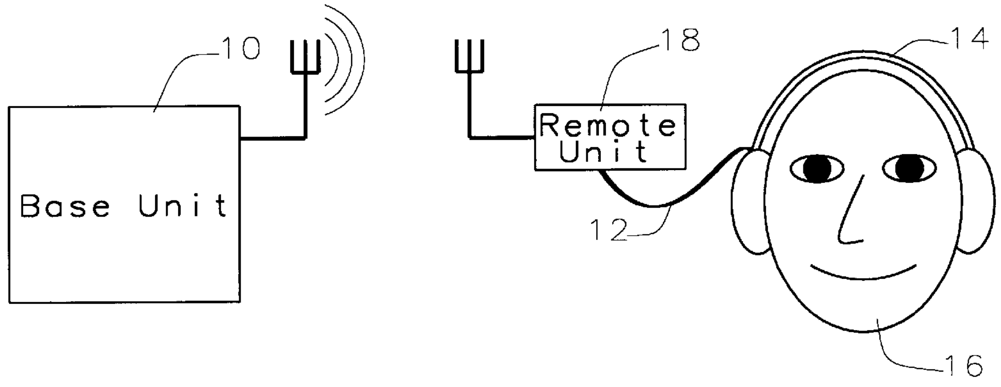
FIG. 2 Prior Art
FIG. 2 illustrating a prior art example of a wireless personal audio entertainment device.
Figure 3:
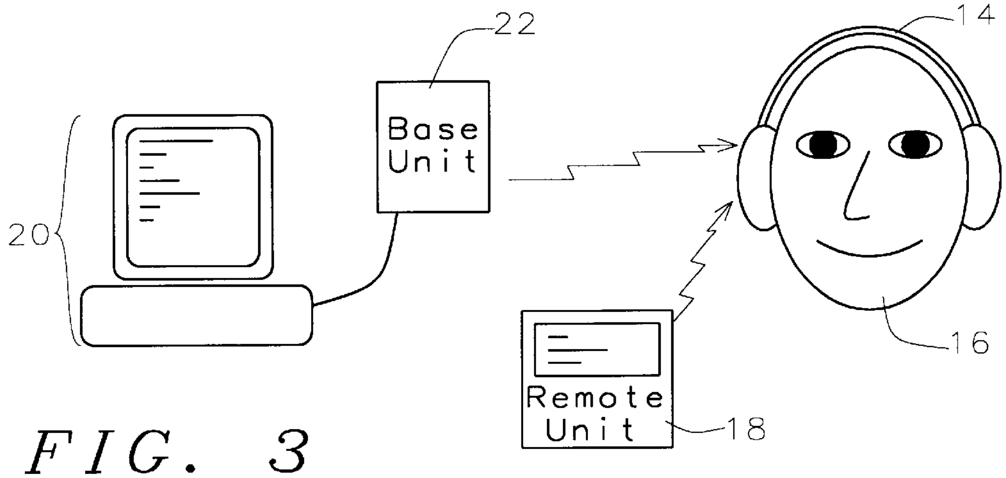
FIG. 3 illustrating a preferred embodiment of the present invention.

Refer now to FIG. 3, showing a system overview of one embodiment of the present invention. A personal computer or other source 20 is connected by wire to a base transmitter 22. A wireless remote control unit 18 is provided that includes display 24, a plurality of controls 26 and a control transmitter 28. The controls 26 may be used to alter audio characteristics including volume, bass, and treble Additionally the controls 26 may be used for on/off selection, song selection, fast forward, reverse, skip and track repeat. A wireless headphone unit 14 contains an audio signal receiver 30 for receiving signals from the base transmitter 22, solid-state memory 32, a converter 34 for transforming digital information into audio signals, amplification 36 and transducers 38 for converting the amplified audio signals into sound. The solid-state memory 32 may be removed and additional memory added. In addition, the headphone unit 14 has a control receiver 40 for accepting and processing commands from the remote control unit 18 and a control circuit 42 to interpret control signals providing control of playback. The headphone unit 14 may also transmit certain information to the remote control unit 18 such as song titles, number of songs stored, remaining memory space, battery life, elapsed time, etc.

To operate the unit, digitally encoded audio signals from the source 20 are sent to the base transmitter 22 and downloaded to the audio signal receiver 30 within the headphone unit 14 and are then stored in sold-state memory 32 for playback. This wireless transmission is accomplished using infrared, radio frequency, magnetic coupling or oth er electromagnetic means. Infrared communication can be used for line-of-sight and indoor applications. Radio frequency and magnetic coupling techniques would be required for non-line-of-sight and outdoor applications. Duplex communication may be used between the first receiver 30 and the base transmitter 22 to acknowledge successful downloading of data or to transmit user driven commands. If only one-way communication is used, a successful transmission indicator lamp, such as a light emitting diode, may be illuminated to indicate successful downloading of audio content. The system is designed so that playback of the audio signal may be accomplished simultaneously with download of audio content.

Control of the headphone audio characteristics and playback controls are achieved by wireless transmission from control transmitter 28 within the remote unit 18 to the control receiver 40 within the headphones 14. This may also be performed using infrared, radio frequency, magnetic or electromagnetic means, and infrared communication can be used for line-of-sight and indoor applications while radio frequency and magnetic coupling techniques would be required for non-line-of-sight and outdoor applications. The system is designed such that signals from the control transmitter 28 do not interrupt the downloading of audio content from the base transmitter 22 to the audio signal receiver 30. The bit rates for audio content download are much higher than those used for control signals, thus the transmission method between the base transmitter 22 and audio signal receiver 30 need not be the same as that used between the control transmitter 28 and control receiver 40. Two-way communication between the headphone unit would be required if features such as display of song titles, number of songs stored, memory space available and headphone battery life were to be shown on the display 24 of the remote control unit 18.

The key element of the present invention is the paradigm shift from the prior art Walkman (registered trademark) in terms of implementation. In a Walkman (registered trademark), the content is inserted into the base unit and the user wears wired headphones. In the present invention, the content is downloaded to the headphones either by wireless communication or by direct plug-in of a memory module to the headphones and control of playback is achieved using a smaller wireless remote unit. The user experience is the same as in the prior art Walkman (registered trademark), except that with the present invention the headphones are wireless and the control unit is much smaller.

While the invention has been particularly shown and described with reference to the preferred embodiments thereof, it will be understood by those skilled in the art that various changes in form and details may be made without departing from the spirit and scope of the invention.

What is claimed is:

1. A personal on-demand audio entertainment device comprising:

a base transmitter unit connected to a digital audio signal source;

a remote control unit comprising:

a display;

a plurality of controls; and a control transmitter to transmit control signals;

and a headphone comprising:

a first receiver for wireless downloading of said digital audio signals from said base transmitter;

a storage device for storing downloaded said digital audio signals;

a decoder for converting said stored digital audio signals into analog audio signals;

an amplifier to increase the amplitude of said analog audio signals;

a transducer for converting said analog audio signals into sound waves during audio playback;

a second receiver for wireless reception of said control signals from said remote control unit; and a control circuit to interpret said control signals providing control of said playback.

2. The device according to claim 1 wherein said controls on said remote control unit are selected from the group consisting of volume, bass, treble, fast forward, reverse, skip, repeat, song title search, battery life, number of songs stored, elapsed time and on/off.

3. The device according to claim 1 wherein said downloading of said digital audio signals from said base transmitter may occur simultaneously with said audio playback.

4. The device according to claim 1 wherein said downloading of said digital audio signals from said base transmitter may occur simultaneously while said headphones are receiving said control signals from said remote control.

5. The device according to claim 1 wherein said downloading of said digital audio signals from said base transmitter to said headphones is accomplished using infrared transmission.

6. The device according to claim 1 wherein said downloading of said digital audio signals from said base transmitter to said headphones is accomplished using radio frequency transmission.

7. The device according to claim 1 wherein said downloading of said digital audio signals from said base transmitter to said headphones is accomplished using electromagnetic coupling.

8. The device according to claim 1 wherein said downloading of said digital audio signals from said base transmitter to said headphones is accomplished using magnetic coupling.

9. The device according to claim 1 wherein said transmission of said control signals from said remote control unit to said headphones is accomplished using infrared transmission.

10. The device according to claim 1 wherein said transmission of said control signals from said remote control unit to said headphones is accomplished using radio frequency transmission.

11. The device according to claim 1 wherein said transmission of said control signals from said remote control unit to said headphones is accomplished using electromagnetic transmission.

12. The device according to claim 1 wherein said transmission of said control signals from said remote control unit to said headphones is accomplished using magnetic coupling.

13. A personal on-demand audio entertainment device comprising:

a base transmitter unit connected to a digital audio signal source;

a remote control unit comprising:

a display;

a plurality of controls; and a control transmitter to transmit control signals;

and a headphone comprising:

a first receiver for downloading of said digital audio signals from said base transmitter;

a storage device for storing said digital audio signals;

a decoder for converting said stored digital audio signals into analog audio signals;

an amplifier to increase the amplitude of said analog audio signals;

a transducer for converting said analog audio signals into sound waves during audio playback wherein said downloading of said digital audio signals from said base transmitter may occur simultaneously with said audio playback;

a second receiver for receiving said control signals from said remote control unit; and a control circuit to interpret said control signals providing control of said playback.

14. The device according to claim 13 wherein said controls on said remote control unit are selected from the group consisting of volume, bass, treble, fast forward, reverse, skip, repeat, song title search, battery life, number of songs stored, elapsed time and on/off.

15. The device according to claim 13 wherein said downloading of said digital audio signals from said base transmitter may occur simultaneously while said headphones are receiving said control signals from said remote control.

16. The device according to claim 13 wherein said downloading of said digital audio signals from said base transmitter to said headphones is accomplished using infrared transmission.

17. The device according to claim 13 wherein said downloading of said digital audio signals from said base transmitter to said headphones is accomplished using radio frequency transmission.

18. The device according to claim 13 wherein said downloading of said digital audio signals from said base transmitter to said headphones is accomplished using electromagnetic transmission.

19. The device according to claim 13 wherein said downloading of said digital audio signals from said base transmitter to said headphones is accomplished using magnetic coupling.

20. The device according to claim 13 wherein said transmission of said control signals from said remote control unit to said headphones is accomplished using infrared transmission.

21. The device according to claim 13 wherein said transmission of said control signals from said remote control unit to said headphones is accomplished using radio frequency transmission.

22. The device according to claim 13 wherein said transmission of said control signals from said remote control unit to said headphones is accomplished using electromagnetic transmission.

23. The device according to claim 13 wherein said transmission of said control signals from said remote control unit to said headphones is accomplished using magnetic coupling.

24. A personal on-demand audio entertainment device comprising:

a base transmitter unit connected to a digital audio signal source;

a remote control unit comprising:

a display;

a plurality of controls; and a control transmitter to transmit control signals;

and a headphone comprising:

a first receiver for downloading of said digital audio signals from said base transmitter;

a storage device for storing said digital audio signals;

a decoder for converting said stored digital audio signals into analog audio signals;

an amplifier to increase the amplitude of said analog audio signals;

a transducer for converting said analog audio signals into sound waves during audio playback wherein said downloading of said digital audio signals from said base transmitter may occur simultaneously with said audio playback;

a second receiver for receiving said control signals from said remote control unit wherein said downloading of said digital audio signals from said base transmitter may occur simultaneously while said headphones are receiving said control signals; and a control circuit to interpret said control signals providing control of said playback.

25. The device according to claim 24 wherein said controls on said remote control unit are selected from the group consisting of volume, bass, treble, fast forward, reverse, skip, repeat, song title search, battery life, number of songs stored, elapsed time and on/off.

26. The device according to claim 24 wherein said downloading of said digital audio signals from said base transmitter to said headphones is accomplished using infrared transmission.

27. The device according to claim 24 wherein said downloading of said digital audio signals from said base transmitter to said headphones is accomplished using radio frequency transmission.

28. The device according to claim 24 wherein said downloading of said digital audio signals from said base transmitter to said headphones is accomplished using electromagnetic transmission.

29. The device according to claim 24 wherein said downloading of said digital audio signals from said base transmitter to said headphones is accomplished using magnetic coupling.

30. The device according to claim 24 wherein said transmission of said control signals from said remote control unit to said headphones is accomplished using infrared transmission.

31. The device according to claim 24 wherein said transmission of said control signals from said remote control unit to said headphones is accomplished using radio frequency transmission.

32. The device according to claim 24 wherein said transmission of said control signals from said remote control unit to said headphones is accomplished using electromagnetic transmission.

33. The device according to claim 24 wherein said transmission of said control signals from said remote control unit to said headphones is accomplished using magnetic coupling.

* * * * *